United States Patent [19]
Hummel

[11] Patent Number: 5,765,819
[45] Date of Patent: Jun. 16, 1998

[54] VIBRATION ISOLATION GROMMET

[75] Inventor: Paul A. Hummel, Des Plaines, Ill.

[73] Assignee: Macrotech Fluid Sealing, Inc., Salt Lake City, Utah

[21] Appl. No.: 395,681

[22] Filed: Feb. 28, 1995

Related U.S. Application Data

[63] Continuation-in-part of Ser. No. 199,559, Feb. 22, 1994, abandoned.
[51] Int. Cl.[6] ............................................. F16F 1/36
[52] U.S. Cl. ........................ 267/153; 267/273; 267/181.2
[58] Field of Search .................................. 267/292, 293, 267/220, 141.2, 141.3, 141.4, 141.5, 140.2, 153; 411/360, 907, 908

[56] References Cited

U.S. PATENT DOCUMENTS

| | | | |
|---|---|---|---|
| 3,128,999 | 4/1964 | Schmitt | 267/153 |
| 3,350,042 | 10/1967 | Stewart et al. | 267/141.4 |
| 3,895,408 | 7/1975 | Leingang | 267/153 X |
| 4,391,436 | 7/1983 | Fishbaugh | 267/140.2 X |
| 4,521,004 | 6/1985 | Caldwell | 267/141.4 |
| 4,890,966 | 1/1990 | Umezawa | 411/908 X |

*Primary Examiner*—Lee W. Young
*Attorney, Agent, or Firm*—Lyon, P.C.

[57] ABSTRACT

A vibration isolator grommet comprises a sleeve and an annular elastomeric element. The sleeve has a cylindrical portion with a radially outwardly extending flange at one end thereof. The elastomeric element has a flange underlying the flange on the sleeve, a cylindrical portion telescoped over the cylindrical portion of the sleeve, and a radially inwardly extending portion initially underlying the cylindrical portion of the sleeve but movable radially outwardly upon axial advancement of the sleeve relative to the elastomeric element to lock the grommet in a workpiece.

2 Claims, 1 Drawing Sheet

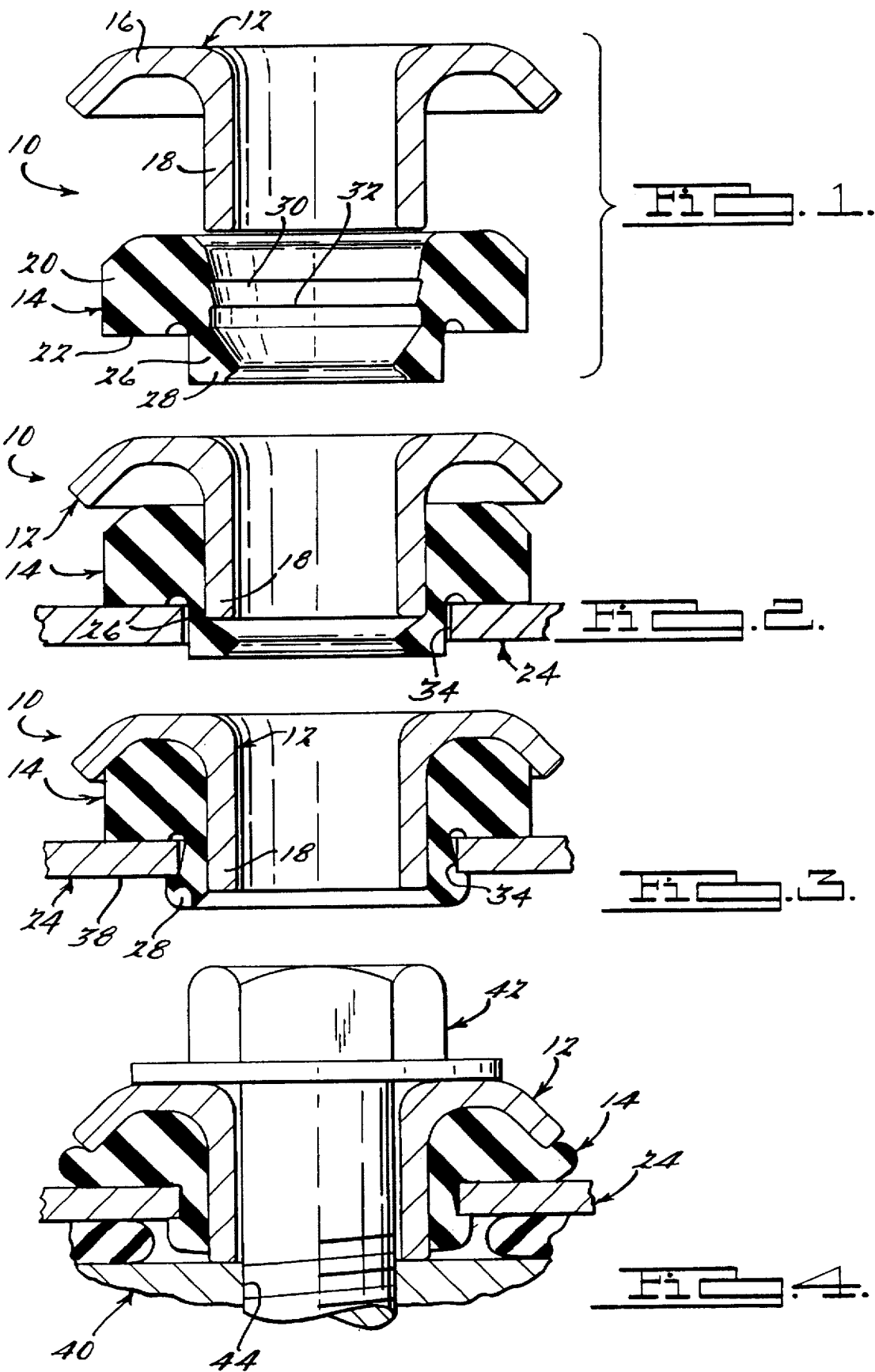

VIBRATION ISOLATION GROMMET

CROSS-REFERENCE TO RELATED APPLICATIONS

This application is a continuation-in-part of patent application Ser. No. 08/199,559, filed on Feb. 22, 1994, now abandoned.

BACKGROUND OF THE INVENTION

This invention relates generally to vibration isolation systems and more particularly to a grommet that isolates a workpiece from direct contact with a supporting structure. The instant invention has particular application to damping of automotive engine valve covers.

Engine vibrations are characteristically transmitted to the engine valve covers which in turn resonate to produce objectionable noise. Attempts to dampen the covers themselves have met with only limited success. The usual method of damping a valve cover is to isolate the cover from the mating engine surface by an elastomeric gasket or grommet. However, elastomeric gaskets or grommets heretofore known and used have proved to be either difficult to assemble on a workpiece, fail to exhibit independent retention capability on the workpiece, or require "blind" assembly with a supporting structure to effect retention on the workpiece.

More specifically, the patent to Nelson, U.S. Pat. No. 4,522,378 discloses a grommet wherein a lower vibration damping member is substantially larger than the aperture in the workpiece rendering assembly therewith relatively difficult. Moreover, the Nelson teaching is devoid of structure that effects positive retention of the grommet on a workpiece. Therefore, the Nelson grommet exhibits the assembly problem characteristic of prior art grommets to which the present invention offers a solution.

The patent to Schmitt, U.S. Pat. No. 3,128,999 discloses a grommet that is easily assembled with a workpiece but offers no retention capability whatsoever in the absence of assembly of the workpiece with a fastener and supporting structure.

The patent to Stewart, U.S. Pat. No. 3,350,042, like Schmitt, discloses a grommet that is easily assembled with a workpiece. However, Stewart also requires assembly of the workpiece with a supporting structure and fastener to effect grommet retention.

SUMMARY OF THE INVENTION

The aforesaid problems are solved by a grommet, in accordance with a constructed embodiment of the present invention, comprising a flanged cylindrical sleeve made of a material with low creep relaxation, for example steel. The sleeve has three key features, namely, (1) the flange of the sleeve compresses and preloads a complementary flange of an elastomeric element, (2) the cylindrical portion of the sleeve effects locking of the grommet for a workpiece, and (3) the cylindrical portion of the sleeve provides for compression limitation. The inside diameter of the sleeve is sized to freely accept a mounting fastener.

The flange section of the elastomeric element isolates the flange of the sleeve from the cover and a cylindrical portion of the elastomeric element isolates the cylindrical portion of the sleeve from the cover. The flange on the elastomeric element is loaded in controlled compression when a fastener is tightened through the grommet.

The cylindrical portion of the elastomeric element has an inside diameter slightly smaller than the cylindrical portion of the sleeve so that the sleeve and element are joined as a preassembly. However, the outside diameter of the cylindrical section of the elastomeric element is preferably slightly smaller than the mounting hole in the workpiece so that the assembly can easily be inserted in a hole in a workpiece.

In accordance with one feature of the invention, the lower inside wall of the cylindrical section of the elastomeric element tapers inwardly to define a truncated conical section that is displaced radially outwardly upon assembly of the element and sleeve in a workpiece. More specifically, the elastomeric element is preassembled about the flanged sleeve with the lower end of the cylindrical portion of the sleeve positioned just above the inwardly tapered conical section of the elastomeric element. After the assembly is placed in a complementary hole in a workpiece, a downward bias on the flange of the sleeve or advancement of a complementary retention bolt into a supporting structure, forces the flange on the sleeve downwardly against the flange of the elastomeric element. Concomitantly, the lower cylindrical section of the sleeve biases the lower radially inwardly tapered section of the elastomeric element radially outwardly to a diameter larger than the mounting hole, then limits further compression of the flange of the elastomeric element by engaging the supporting structure. Because there is no significant initial interference between the grommet and the mounting hole in the workpiece, no lubricant is required. In practice, a conventional gasket is interposed between the workpiece and the supporting structure to effect fluid sealing therebetween.

BRIEF DESCRIPTION OF THE DRAWINGS

FIG. 1 is a cross-sectional view of the grommet components of the invention prior to preassembly;

FIG. 2 is a view similar to FIG. 1 of the grommet in the preassembled condition and partially installed in a workpiece;

FIG. 3 is a view similar to FIG. 2 showing the grommet fully assembled in the workpiece; and FIG. 4 is a view showing the workpiece assembled to a supporting structure by a complementary bolt.

DETAILED DESCRIPTION OF THE PREFERRED EMBODIMENT(S)

As best seen in FIG. 1 of the drawings, a grommet 10 comprises a metal sleeve 12 and an elastomeric element 14. The sleeve 12 has a radially outwardly extending flange 16 and a downwardly depending cylindrical section 18.

The elastomeric element 14 comprises a radially extending relatively heavy flange section 20 with a radially extending face 22 for engagement with a workpiece 24. The elastomeric element 14 has an axially extending portion 26 with a relatively large radially inwardly extending truncated conical lip 28 at the lower extremity thereof.

As seen in FIG. 1, a cylindrical inner face of the flange 20 of the elastomeric element 14 is provided with a pair of annular ribs 30 and 32 to effect retention of the elastomeric element 14 on the sleeve 12 as a preassembly.

As seen in FIG. 2 the sleeve 12 of the grommet 10 has been assembled with the elastomeric element 14 as a preassembly and the preassembly inserted in a complementary aperture 34 in the workpiece 24. The cylindrical lower end portion 18 of the sleeve 12 is disposed short of the radially inwardly extending conical portion 28 of the elastomeric element 14 thereby to allow the axially extending portion 26 of the elastomeric element 14 to remain in an essentially cylindrical radially contracted configuration.

As seen in FIG. 3 of the drawings, the grommet 10 has been assembled with the workpiece 24 by axial advancement of the sleeve 12. It is to be noted that the lower end portion 18 of the sleeve 12 has effected radially outward movement of the conical portion 28 of the elastomeric element 14 whereby it underlies a bottom surface 38 of the workpiece 24 so as to positively retain the grommet 10 thereon to facilitate assembly of the workpiece 24 to a supporting structure 40.

As best seen in FIG. 4, a bolt 42 is engaged in a complementary threaded bore 44 in the support structure 40 so as to bias the sleeve 12 and elastomeric element 14 toward the workpiece 24 thereby compressing the flange portion 20 of the elastomeric element 14. It is to be noted that in the assembled condition, compression of the flange portion 20 of the elastomeric element 14 is controlled by engagement of the lower end portion 18 with the support structure 40.

From the foregoing it should be apparent that the workpiece 24 is totally isolated from the supporting structure 40 by the elastomeric element 14 and that excessive compression of the elastomeric element 14 is precluded.

While the preferred embodiment of the invention has been disclosed, it should be appreciated that the invention is susceptible of modification without departing from the scope of the following claims.

I claim:

1. A vibration isolator grommet capable of preassembly with a workpiece and cooperative with a workpiece supporting structure to limit compression of an elastomeric element of the grommet, said grommet comprising:

a compression limiting metal sleeve having a cylindrical portion with a radially outwardly extending flange at one end thereof; and an annular elastomeric element having a radially outwardly extending flange portion at one end thereof underlying the flange on said sleeve and a cylindrical portion with an inside diameter complementary to the outside diameter of the cylindrical portion of said sleeve so as to be acceptable thereover in a slidable frictional fit, the cylindrical portion of said elastomeric element having an outside diameter less than the diameter of a grommet accepting aperture in said workpiece whereby said grommet is readily accepted therein, said element having a radially inwardly extending portion at the opposite end of the cylindrical portion thereof from the flange portion thereon initially underlying the cylindrical portion of said sleeve but movable radially outwardly upon axial advancement of said sleeve relative to said elastomeric element to lock said grommet in the aperture in said workpiece, the length of the cylindrical portion of said metal sleeve being related to the length of the cylindrical portion of said elastomeric element so as to be engageable with the supporting structure to limit compression of the flange of said elastomeric element.

2. The grommet of claim 1 wherein the radially inwardly extending portion of said element is of truncated conical configuration.

* * * * *